Jan. 11, 1938.   A. W. BRUCE   2,105,107
APPARATUS FOR TREATING POULTRY
Original Filed Oct. 4, 1933   2 Sheets-Sheet 1
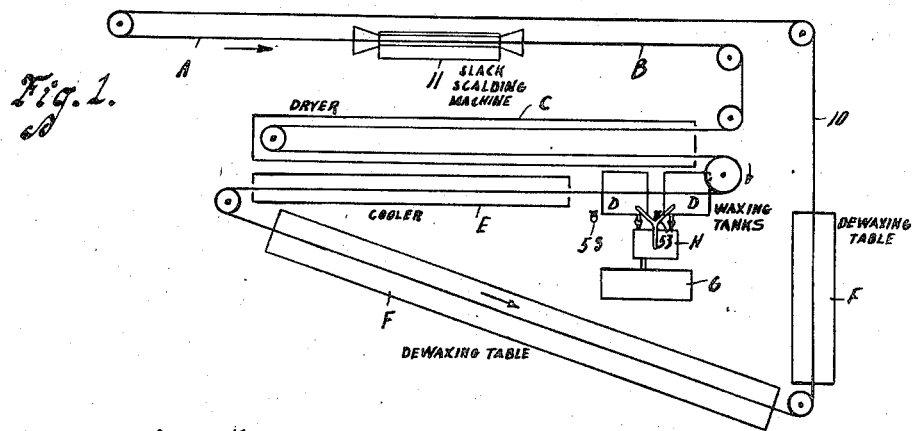
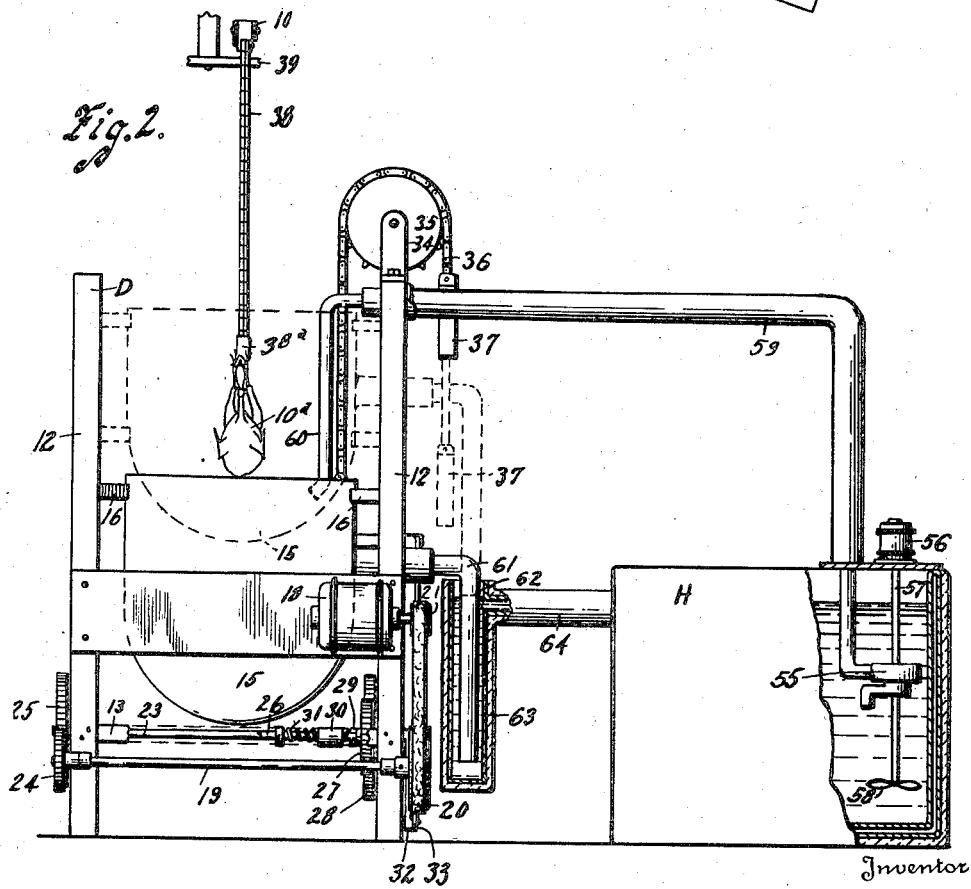

Jan. 11, 1938. A. W. BRUCE 2,105,107
APPARATUS FOR TREATING POULTRY
Original Filed Oct. 4, 1933 2 Sheets-Sheet 2
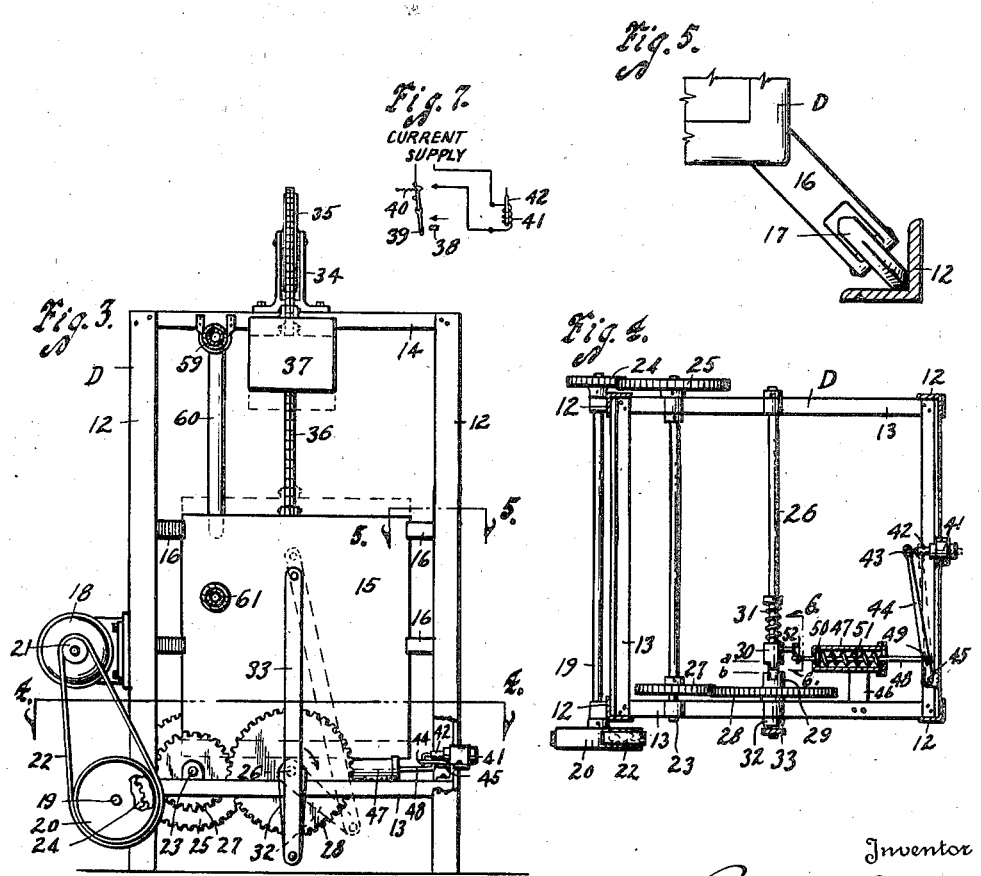

Patented Jan. 11, 1938

2,105,107

UNITED STATES PATENT OFFICE 2,105,107

APPARATUS FOR TREATING POULTRY

Albert W. Bruce, Ottumwa, Iowa

Original application May 21, 1934, Serial No. 726,709, which in turn is a division of Serial No. 692,117, October 4, 1933. Divided and this application October 15, 1934, Serial No. 748,380

3 Claims. (Cl. 17—11.1)

My invention relates to an apparatus for treating poultry, and particularly to an apparatus in which at one stage in the treatment, the birds are subjected to a coating of adhesive material (wax) which is subsequently removed for taking off feathers, down, hair and dirt.

This is a division of my application, Serial No. 726,709, filed May 21, 1934, on which Patent No. 1,977,542 issued on Oct. 16, 1934, which in turn was a divisional application from my earlier application, Serial No. 692,117, filed Oct. 4, 1933, on which Patent No. 1,960,048 issued on May 22, 1934.

One of the objects is to provide an apparatus for treating fowls, which permits among other things the application of an adhesive coating to the body of the fowls while the fowls are supported by their heads and feet with their backs up.

It is also the purpose of my invention to provide an apparatus for treating poultry for the removal of feathers, hair and extraneous material therefrom.

Still another object is to provide an apparatus for treating fowls for the general purpose mentioned, the features of which apparatus will be hereinafter fully described.

An additional object is to provide in such an apparatus, convenient and suitable controls for furthering the efficient use of the apparatus and the practice of the process.

Among other things, it is my object to provide in such an apparatus certain particular means for maintaining wax in a tank at proper temperature and at a desired level.

It will be seen from the following specification that my mechanism includes numerous novel details of structure and arrangement in an apparatus of the general kind mentioned.

With these and other objects in view, my invention consists in the construction, arrangement and combination of the various parts of my apparatus for treating poultry, whereby the objects contemplated are attained, as hereinafter more fully set forth, pointed out in my claims, and illustrated in the accompanying drawings, in which:

Figure 1 is a diagrammatic view illustrating an installation including my machine.

Figure 2 is a front elevation of one of the waxing tanks and a tempering tank, parts being broken away and parts being shown in section.

Figure 3 is a side elevation of the waxing tank, parts being shown in section.

Figure 4 is a horizontal, sectional view taken on the line 4—4 of Figure 3, parts being shown in section and the tank proper being omitted for the better showing of the other parts.

Figure 5 is a detailed, sectional view taken on the line 5—5 of Figure 3.

Figure 6 is a detailed, sectional view taken on the line 6—6 of Figure 4, illustrating the clutch cam.

Figure 7 is a diagram illustrating the circuit for the clutch controlling solenoid.

By referring to Figure 1, the general arrangement of my machine and its relation to the general environment in which it is installed, may be briefly described.

I have used the reference numeral 10 to indicate an endless conveyor in the form of a chain or otherwise on which the fowls are carried from the point where they are hung to the various operative mechanisms.

The fowls 10a (Figure 2) are preferably hung on the endless conveyor by means of shackles, which in themselves form no part of my present invention. They are supported by their feet and are killed at about the point indicated at A in Figure 1.

They then pass to a slack scalding machine 11, where they are semi-scalded. From the machine 11, they pass to the point B, and at about that point, they are rough-picked. They then pass into a cooling chamber C where they are cooled and dried. It is important that the fowls should be dried, and cooled to some extent, before they are subjected to the melted wax.

From the dryer, the fowls pass to a machine or machines D for giving them the wax coating, and then they are immediately passed through a cooler E from which they go to the de-waxing tables F, where the wax coating, together with hair, down, feathers and so on, is removed.

At G, I have shown the reclaiming tank in which the wax is separated from the dirt and feathers and so on.

From the tank G, the reclaimed wax is conveyed to the tempering tank H, where the wax is heated and maintained at a fixed predetermined temperature.

Waxing mechanism

The type of waxing mechanism now under consideration, and shown in Figures 2 to 7, inclusive, uses a wax containing tank and provides a method for raising this tank at the proper time during the travel of the birds on the conveyor for subjecting the bodies of the birds to a coating of wax. This wax is a composition which need not be further here described.

I provide a frame for supporting and guiding the wax tank now under consideration. The frame has four corner posts 12, preferably comprising angle bars, which are arranged at the corners of a rectangle. Near their lower ends, the successive posts 12 are connected by cross bars 13. At the upper ends of the posts, the members of the opposite respective bars are connected by cross bars 14 extending substantially parallel with the path of travel of the birds on the conveyor. There are no cross bars 14 extending across such path.

The wax tank 15 is mounted for vertical reciprocal sliding movement on the frame just described.

As shown in the drawings, the tank 15 is provided at the corners with horizontally projecting arms 16, provided at their outer ends with rollers 17 adapted to travel in the channels formed by the angle bar corner posts 12 (see Figures 3 and 5).

As illustrated in Figures 2 and 3, the fowls travel along, supported on the endless conveyor and remain at a constant height. At the proper point in their travel, the tank 15 is raised to cause the body of the fowl immediately above it to be dipped in the wax.

The fowls are hung by the legs for killing and are so supported as they travel through the slackscalding machine 11, and during the rough picking operation and during their travel through the cooler C.

Before they reach the waxing tank, their heads are trussed up on the shackles so that they are then hung by both their feet and their heads during the application of the wax. They are so hung to avoid getting wax on their heads and feet.

*Tank raising mechanism*

Any suitable mehanism may be employed. I have shown one which has been tried out.

Supported on the frame of each waxing tank 15, at what may be called the forward side thereof, being the side from which the fowls approach the tank, is an electric motor 18. Below the motor 18, a transverse shaft 19 is suitably journaled on a pair of the frame members 12. On one end of the shaft 19 is a pulley 20 aligned with a pulley 21 on the motor shaft, and operated therefrom by means of a belt 22. Parallel with the shaft 19 slightly rearwardly thereof is a shaft 23 suitably journaled on the frame as at two opposite cross bars 13.

On the end of the shaft 23 opposite the gear 25 is fixed a pinion 27, which meshes with a gear 28 rotatably but non-slidably mounted on the shaft 26, supported on the frame. Formed on the gear 28 is a clutch member 29. A clutch member 30 is slidably but non-rotatably mounted on the shaft 26 and is tensioned toward the clutch member 29 by means of a spring 31. On the shaft 26 outside the frame of the waxing tank is fixed an arm 32, shown in full lines in one position in Figure 3 and in dotted lines in another position. Pivoted to the outer end of the arm 32 is a link 33 which extends upwardly and is pivoted to the tank 15.

It will be seen that when the gear 28 is rotated, the arm 32 and link 33 will cause the tank 15 to be alternately raised and lowered.

On a frame member 14 is mounted the bracket 34, which carries the sprocket wheel or the like 35. A chain 36 is secured to the side of the tank 15 and is trained over the sprocket 35 and supports the counterweight 37 for counterbalancing the tank 15.

It will be obvious that the structure here shown is illustrative only and that counterweights or counterbalancing springs could be used on both sides of the tank and that mechanism such for instance as that comprised in the gear 28, the arm 32 and link 33 could be duplicated on opposite sides of the tank if that were desirable.

It will be observed that when the device is in operation, the motor will be running and will impart continuous rotation to the gear 28.

*Clutch control*

For controlling the clutch member 30, so that it will be moved into cooperative relation with the clutch member 29 at the proper time in the passage of the fowl, I have provided the following means:

Chains 38 hang from the conveyor 10 and support the shackles 38a. Arranged at proper points in the path of the chains 38 from which the fowls are supported by means of the shackles 38a mentioned are the pivoted switch arms 39. These switch arms may be located where desired and the waxing tanks are readily portable.

When a particular chain reaches the position where the fowl thereon hangs above the waxing tank D, the chain 38 swings the switch arm 39 (see Figures 2 and 7) to switch closing position.

As the chain continues to travel, it soon slides past the switch arm 39, which is thereupon pulled to circuit breaking position by means of the spring 40.

When the switch arm is actuated for closing the circuit in the manner just indicated, the circuit is closed through a solenoid 41. (Figures 4 and 7). The core 42 of the solenoid has a pivotal connection at 43 with one end of the lever 44, the other end of which is pivoted at 45. (Figure 4).

Supported on the bracket 46 on the waxing tank frame is a tubular casing 47 through which slides the rod 48, which has a loose pivotal connection to the lever 44 at 49. Fixed to the rod 48 within the casing 47 is a washer or the like 50. A spring 51 bears against the washer 50 and against the opposite end of the casing 47 with the effect of normally tending to pull the solenoid core 42 outwardly.

When the solenoid is energized and the core is pulled in, the lever 44 is actuated to compress the spring 51 and pull the rod 48 from its position shown in Figure 4 toward the right.

The clutch member 30 carries a projecting cam plate 52. (Figures 4 and 6). When the shaft 26 is rotated, thereby rotating the clutch member 30, and the rod 48 is in its lefthand position, the cam plate 52 engages the projecting left end of the rod 48, and in the further rotation of the clutch member, the rod 48 travels along the face of the cam 52 and thus shoves the clutch member from the position *b* of Figure 4 to position *a* thereof, against the tension of the spring 31 for declutching the mechanism.

The parts then remain in such position until the appropriate chain or the like actuates the switch arm 39 for closing the circuit through the solenoid 41. Thereupon the core 42 is pulled inwardly for pulling the arm 48 (Figure 4) to the right and withdrawing the left-hand end of the said arm from engagement with the cam plate 52.

The spring 31 then forces the clutch member 30 into engagement with the clutch member 29 and the rotation of the gear 28 acting through the clutch members imparts one full rotation to the shaft 26. The rotation of that shaft through the media of the arm 32 and link 33 raises the tank 15 from full line position shown in Figures 2 and 3 to the dotted line position shown in Figure 2, for immersing a fowl in the wax bath, and then lowers the tank. In the meanwhile the chain will have cleared the switch arm 39 and the spring 40 will have broken the circuit (Figure 7) and the spring 51 will have actuated the rod 48 for projecting the end of the rod 48 into the path of the cam 52 and for simultaneously withdrawing the core 42. After one cycle or rotation of the shaft 26, the cam plate 52 will engage the rod 48 and be moved to declutching position.

The fowl moves on to the next waxing tank and is again treated to a waxing operation. With some wax, it is difficult to get enough wax on the fowl at one dipping. With other wax, one dipping is enough.

The fowls are automatically conveyed from the waxing tank to and through the cooler. I may provide fans 53 or other means for blowing cold air on the fowls for giving the initial set to the wax coating as quickly as possible after the fowls leave the wax bath.

It will be understood that there is a constant flow of wax from the tempering tank to each waxing tank and back to the tempering tank.

The wax tank is heat insulated in any suitable way.

A controlled flow of wax from the reclaiming tank to the tempering tank may be provided for in any suitable way.

I shall now describe the temperature controls for the tempering tank and the flow arrangement between the tempering tank and the wax tanks.

Tempering tank

In Figures 1 and 2, I have illustrated a tempering tank H having a steam and water jacket 54. The outer wall is also heat insulated in any suitable way.

In the tempering tank is a pump 55 operated from a motor 56 by means of a shaft 57, which extends through the pump and has on its lower end in the lower part of the tempering tank an agitator 58.

The wax is pumped from the tank H through the heat insulated pipe 59 to the down-turned pipe 60 extending into the top of the tank 15. The pipe 60 is so arranged that it discharges into the upper part of the tank 15 when the latter is in lowered position and is substantially projected into the tank 15 when the latter is raised, without interfering with the movement of the tank.

Leading from the upper part of the tank 15 is the discharge pipe 61, having a downward extension 62 telescopically received in the upright heat insulated pipe 63. A heat insulated pipe 64 leads from the upper part of the pipe 63 into the upper part of the tempering tank H.

Thus during the operation of the machine, the constant flow of wax between the tempering tank and the waxing tank may be maintained.

Also, the arrangement is such as to maintain the wax in the waxing tank at the level of the outlet pipe 61 regardless of the amount of wax used on the fowls.

The temperature of the wax in the tempering tank is maintained within predetermined limits, and I thereby maintain the liquidity of the wax in the tank 15.

One and the same form of a suitable mechanism for controlling the temperature of the wax in the tempering tank H is disclosed in each of the above-mentioned applications.

It will be seen from the foregoing that I have provided means for coating the fowls, after they have been rough-picked, with a wax-like substance, which is immediately cooled and may then be pulled off, carrying with it the hair, pin feathers and so forth.

The fowl may be supported with its back down or with its back up. I find the latter method of hanging the bird preferably because the wax splits better across the back of the bird a little better when the head is lowered for the dewaxing operation.

It will also be seen from the foregoing that the mechanism for accomplishing this purpose can be modified in many respects, and it is my purpose to cover by my claims any such modifications or use of mechanical equivalents, which may be included within the scope of my claims and of my invention.

It will be observed that I have in the foregoing description explained a novel method for treating fowls. In the practice of this method, the fowls are rough-picked. This is usually done with the fowls hanging by their feet. The heads of the fowls are then hung up so that the fowls hang by their feet and their heads. Thereupon the fowls, except their heads and feet are subjected to a coating of wax. The reasons for not subjecting the heads and feet are largely explained in the foregoing description.

After the coating of wax has been applied, the coated fowls are immediately subjected to a cooling step, by which the wax is hardened and set. After the cooling, the fowls come to the place where the wax is removed.

I have found that when the fowls are hung by both their heads and their feet during the application of the coating and are cooled while still so supported then when they are straightened out the coating breaks and can easily be pulled off.

This application is largely directed to the particular mechanism employed for handling the fowls and the wax.

I claim as my invention:

1. In fowl waxing apparatus, a waxing tank for holding molten wax, means for mechanically presenting fowls to position above said tank, means for thereupon raising the tank for applying wax to the fowls, means for supplying wax to the tank, an overflow pipe leading from the upper part of the tank and having a down-turned extension and a member telescopically receiving said extension.

2. In fowl waxing apparatus, a waxing tank for holding molten wax, means mechanically presenting fowls to position above said tank, means for thereupon raising the tank for applying wax to the fowls, means for supplying wax to the tank including an overhead pipe with a downward extension above the tank, an overflow pipe leading from the upper part of the tank and having a down-turned extension and a member telescopically receiving said extension, said overhead pipe and said member being in communication with a tempering tank for drawing wax therefrom and returning wax thereto.

3. In fowl waxing apparatus, a waxing tank for holding molten wax, a conveyor for fowls and means actuated by the conveyor for causing the fowls to be coated with wax from said tank when they reach a certain position of their travel on the conveyor, said means including a tank, mechanism for raising and lowering the tank and a device actuated by the travel of the conveyor for putting said mechanism into operation, and means for maintaining the wax at a constant level in the tank in all of its positions.

ALBERT W. BRUCE.